May 25, 1948.　　　　　F. C. SUMMERS　　　　　2,442,184
MEANS FOR CONNECTING TOGETHER BUILDING
BLOCKS AND OTHER BUILDING UNITS
Filed July 8, 1946

INVENTOR.
Frank C. Summers,
BY
Mason & Hatfield
ATTYS.

Patented May 25, 1948

2,442,184

UNITED STATES PATENT OFFICE 2,442,184

MEANS FOR CONNECTING TOGETHER BUILDING BLOCKS AND OTHER BUILDING UNITS

Frank C. Summers, Bethesda, Md.

Application July 8, 1946, Serial No. 682,042

5 Claims. (Cl. 72—107)

This application is concerned with fastening means for fastening together the ends of building blocks, bricks or plaster boards or other building units.

The principal object of the invention is to provide a building block or other building unit with fastening means whereby said units may be readily connected to each other.

Another object of the invention is to provide building units having fastening means to quickly and permanently attach said units to each other.

A further object of the invention is to provide building units with fastening means therefor comprising a minimum of parts whereby said units may be quickly and easily attached to each other.

Further objects will appear hereinafter throughout the specification.

In order to enable residences and other structures to be quickly and easily constructed within a minimum of time there has been provided by the present invention a fastening means for connecting together the building elements composing said structure. These elements may comprise the walls, floors or the roofs of such structures.

Figure 1:
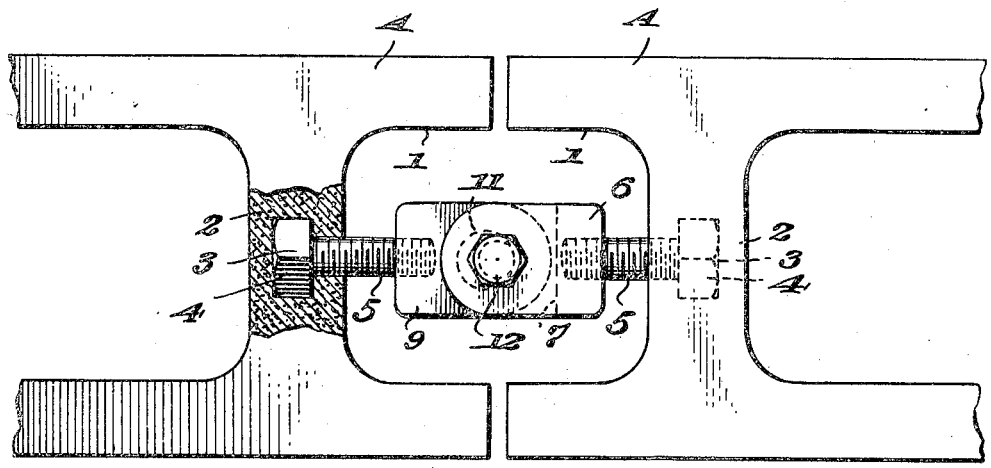
Figure 1 is a top plan view of a pair of building units broken away provided with the improved fastening means.
Figure 2:
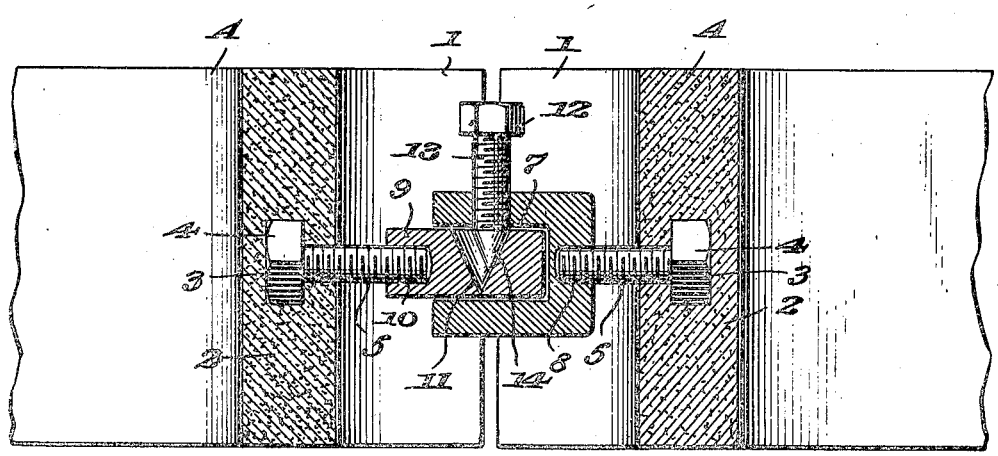
Figure 2 is a vertical sectional view of the construction shown in Figure 1.
Figure 3:
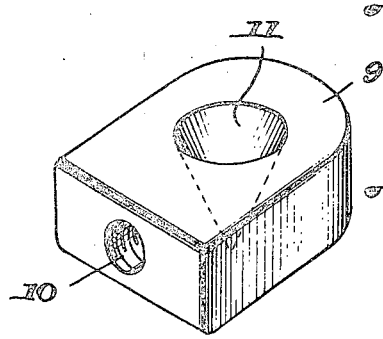
Figure 3 shows one of the fastening elements in perspective.

In the drawing A, A indicates two building blocks, preferably composed of cement, clay, or any of the well known materials which may be molded to the proper shape. For illustrative purposes there has been shown the cementitious blocks A, A. The ends of these blocks are each provided with openings or recesses 1. The numeral 3 indicates a bolt or stud member having a head 4 that has been sunk into the material during the molding or setting thereof. These bolts are mounted in situ in the block. Each bolt is provided with a threaded shank 5, the threads of which are preferably of low pitch. As indicated in Figures 1 and 2 the right hand bolt has threaded onto it a grooved metal fastener 6, the groove being indicated at 7. One end of the grooved fastener 6 is provided with screw threads 8 for the reception of the threaded shank 5 of the bolt 3. The left hand bolt 3 is threaded into the recess 10 of the tongued metal fastener 9.

As shown in the several figures the tongued metal fastener 9 is provided with a recess 11. For convenience this recess is shown as being conical in shape but it will be appreciated that only the right hand side of this recess requires that it be inclined. A locking bolt 12 having a hexagonal or other multi-sided head is threaded into the upper flange of the grooved metal fastener. This bolt is provided with a conical end, as shown in Figure 2.

In order to connect the two building elements A, A to each other the tongued and grooved metal fasteners are screw threaded onto the threaded shanks of the bolts 5. The building elements A, A are then brought together so that their abutting edges are slightly spaced from each other, as shown in Figures 1 and 2, with the tongued and grooved metal fasteners assuming approximately the position shown in Figures 1 and 2. The locking bolt 12 is then turned down until its conical end engages the inclined right side wall of the recess 11. By the application of a socket wrench to the head of the bolt 12, the conical end of said bolt, because of its engagement with the inclined wall of the recess 11, will cause a camming action to take place resulting in the abutting ends of the blocks 10 being brought into engagement with each other. Before threading the bolt 12 into the grooved metal fastener a lock nut (not shown) may be threaded onto said bolt, and when the blocks have been brought together the lock nut may be tightened against the upper flange of the grooved metal fastener.

It will be appreciated that it is not necessary that the recess 11 be conical, as the left hand side of this recess could be straight with only its right side inclined so as to form a camming surface for the conical end of the bolt 12 (as viewed in Figure 2). It will be further noted that the recess 11 is considerably larger in size than the conical end of the bolt.

It will also be understood that other types of recesses 1 may be provided than those shown in Figures 1 and 2, the only requirements being that the ends of the bolts 5 project outwardly from such recesses and that access be had to the head of the bolt 12.

Instead of the threaded bolts 3 as shown, I may use threaded studs located in the same position as bolts 3 and attached by welding or otherwise to metallic reinforcing rods, or other reinforcing elements (not shown), located within the building elements A, A.

Having fully described my invention, it is to be understood that my invention is not to be limited by the specific illustration furnished, but is of the full scope of the appended claims.

I claim:

1. A coupling for connecting together building blocks and other building units comprising a grooved metal fastener having substantially parallel flanges, a stud member extending from said grooved metal fastener, a tongued metal fastener adapted to be inserted between the flanges of said grooved metal fastener, a stud member extending from said tongued metal fastener, one of said flanges having a screw-threaded aperture extending therethrough, a screw-threaded member having a cam end, said tongued metal fastener having a recess of cam shape adapted to be engaged by said cam end on said screw-threaded member, at least one of said stud members being adjustably connected to its metal fastener.

2. A coupling for connecting together building blocks and other building units comprising a grooved metal fastener having substantially parallel flanges, a screw-threaded stud member adjustably extending from said grooved metal fastener, a tongued metal fastener adapted to be inserted between the flanges of said grooved metal fastener, a stud member extending from said tongued metal fastener, one of said flanges having a screw-threaded aperture extending therethrough, a screw-threaded member having a cam end, said tongued metal fastener having a recess of cam shape adapted to be engaged by said cam end on said screw-threaded member.

3. A coupling for connecting together building blocks and other building units comprising a grooved metal fastener having substantially parallel flanges, a stud member extending from said grooved metal fastener, a tongued metal fastener adapted to be inserted between the flanges of said grooved metal fastener, a screw-threaded stud member adjustably extending from said tongued metal fastener, one of said flanges having a screw-threaded aperture extending therethrough, a screw-threaded member having a cam end, said tongued metal fastener having a recess of cam shape adapted to be engaged by said cam end on said screw-threaded member.

4. A coupling for connecting together building blocks and other building units comprising a grooved metal fastener having substantially parallel flanges, a stud member extending from said grooved metal fastener, a tongued metal fastener adapted to be inserted between the flanges of said grooved metal fastener, a screw-threaded stud member extending from said tongued metal fastener, one of said flanges having a screw-threaded aperture extending therethrough, a screw-threaded member having a conical end, said tongued metal fastener having a recess of conical shape adapted to be engaged by said conical end on said screw-threaded member, at least one of said stud members being adjustably connected to its metal fastener.

5. A coupling for connecting together building blocks and other building units comprising a grooved metal fastener having substantially parallel flanges, a stud member extending from said grooved metal fastener, a tongued metal fastener adapted to be inserted between the flanges of said grooved metal fastener, a stud member extending from said tongued metal fastener and in screw-threaded engagement therewith, one of said flanges having a screw-threaded aperture extending therethrough, a screw-threaded member having a conical end, said tongued metal fastener having a recess of conical shape adapted to be engaged by said conical end on said screw-threaded member.

FRANK C. SUMMERS.

REFERENCES CITED

The following references are of record in the file of this patent:

UNITED STATES PATENTS

| Number | Name | Date |
|---|---|---|
| 2,142,388 | Wallace | Jan. 3, 1939 |
| 2,373,409 | Myer | Apr. 10, 1945 |